(12) United States Patent
Luo et al.

(10) Patent No.: US 7,881,712 B1
(45) Date of Patent: Feb. 1, 2011

(54) GENERATING AND SIGNALING TONES IN A COMMUNICATIONS NETWORK

(75) Inventors: Chengsheng Luo, Chelmsford, MA (US); David A. Houghton, Danville, NH (US); Anantha R. Mekala, Leominster, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/113,679

(22) Filed: Apr. 25, 2005

Related U.S. Application Data

(63) Continuation of application No. 11/021,174, filed on Dec. 23, 2004, now abandoned.

(51) Int. Cl.
*H04W 4/00* (2009.01)

(52) U.S. Cl. .................. 455/422.1; 455/414.1; 455/433; 455/450; 455/560; 370/352; 370/390; 370/392; 370/396; 370/464; 379/221.02; 379/406.01

(58) Field of Classification Search .............. 455/432.1, 455/433, 435.1, 435.2, 466, 414.1, 422.1, 455/450, 560; 379/221.02, 201.2, 265.09, 379/221.01, 406.01; 370/352, 354, 356, 370/390, 466, 396, 401, 392, 355
See application file for complete search history.

(56) References Cited

U.S. PATENT DOCUMENTS

| | | | | |
|---|---|---|---|---|
| 6,141,341 A * | 10/2000 | Jones et al. | .................. | 370/352 |
| 6,577,637 B1 * | 6/2003 | Sieppi | ......................... | 370/401 |
| 6,611,694 B1 * | 8/2003 | Oltedal et al. | ................ | 455/560 |
| 6,614,781 B1 * | 9/2003 | Elliott et al. | ................. | 370/352 |
| 6,622,016 B1 * | 9/2003 | Sladek et al. | ............. | 455/414.1 |
| 6,661,788 B2 * | 12/2003 | Angle et al. | ................. | 370/390 |
| 6,731,649 B1 * | 5/2004 | Silverman | ................... | 370/466 |
| 6,882,848 B2 * | 4/2005 | Wieczorek et al. | .......... | 455/450 |
| 6,985,573 B2 * | 1/2006 | Fang | ..................... | 379/221.02 |
| 7,035,260 B1 * | 4/2006 | Betta et al. | ................... | 370/392 |
| 7,092,515 B2 * | 8/2006 | Gierachf | ................ | 379/406.01 |
| 7,145,900 B2 * | 12/2006 | Nix et al. | ..................... | 370/352 |
| 7,212,521 B2 * | 5/2007 | Kwon | ......................... | 370/352 |
| 7,336,668 B2 * | 2/2008 | Adams | ........................ | 370/396 |
| 2001/0024436 A1 * | 9/2001 | Barraclough et al. | ........ | 370/352 |
| 2002/0037001 A1 * | 3/2002 | Jin | .............................. | 370/352 |
| 2002/0058507 A1 * | 5/2002 | Valentine et al. | ............ | 455/433 |
| 2002/0141386 A1 * | 10/2002 | Minert et al. | ............... | 370/352 |

OTHER PUBLICATIONS

"Cisco Voice Interworking Service Module", cisco Systems, Inc., www.cisco.com, pp. 1-5, Copyright date 1992-2004.

"Call Progress Tones", Cisco VCO/4K Supervision and Call Progress Tone Detection, Cisco Systems, Inc., www.cisco.com pp. 4-1 through 4-8.

(Continued)

*Primary Examiner*—Stephen M D'Agosta
(74) *Attorney, Agent, or Firm*—Hamilton, Brook, Smith & Reynolds, P.C.

(57) ABSTRACT

A technique for providing a flexible approach to generating and signaling tones, such as call progress tones, in a communications network is described. Parameters associated with tones generated and signaled in a communication network are dynamically configured. A tone to be generated and signaled onto the network is specified in a request that identifies the tone. Parameters associated with the specified tone are identified. The information representing the tone is then generated in accordance with the identified parameters and signaled onto the communications network.

16 Claims, 5 Drawing Sheets

OTHER PUBLICATIONS

"VISM/VISM-PR Functional Description", Cisco Voice Interworking Services (VISM) Configuration Guide and Command Reference, Cisco Systems, Inc., www.cisco.com, pp. 5-1 through 5-22, Jun. 2004.

"Media Gateway Control Protocol (MGCP)", Andreasen & Foster, pp. 1 through 210, Jan. 2003.

"Basic Media Gateway Control Protocol (MGCP) Packages", Foster & Andreasen, pp. 1 through 64, Dec. 2003.

* cited by examiner

GENERATING AND SIGNALING TONES IN A COMMUNICATIONS NETWORK

RELATED APPLICATION

This application is a continuation of U.S. application Ser. No. 11/021,174, filed Dec. 23, 2004 now abandoned. The entire teachings of the above application are incorporated herein by reference.

FIELD OF THE INVENTION

The present invention relates to communication networks and specifically to a flexible approach to generating and signaling tones in a communication network.

BACKGROUND OF THE INVENTION

Present day cellular mobile telephone systems provide for a large and increasing demand for mobile services. Cellular systems "reuse" frequency within a group of cells to provide wireless two-way radio frequency (RF) communication to large numbers of users.

Each cell may cover a small geographic area and collectively a group of adjacent cells may cover a large geographic region. Each cell uses a fraction of the total amount of RF spectrum available to support users (cellular users) at mobile stations, such as a mobile phone handset or a personal computer. Cells may be of different sizes (for example, macro-cell or micro-cell) and are generally fixed in capacity. The actual shapes and sizes of cells are complex functions based on terrain, the man-made environment, the quality of communication and the user capacity.

Cells are typically connected to each other via communication links, such as telephone lines or microwave links. The cells, in turn, may be connected to a packet-switched network, such as a Voice Over Internet Protocol (VoIP) network, through switches that are adapted to interface the cells with the packet-switched network. These switches typically provide various functions to support communication with cellular users, such as the hand-off from cell to cell as a user moves between cells.

In conventional cellular systems, each cell has a base station with RF transmitters and RF receivers co-sited for transmitting and receiving communications to and from cellular users in the cell. The base station employs forward RF frequency bands (carriers) to transmit forward channel communications to users and employs reverse RF carriers to receive reverse channel communications from users in the cell.

The forward and reverse channel communications use separate frequency bands so that simultaneous transmissions in both directions are possible. This operation is referred to as frequency division duplex (FDD) signaling. In time division duplex (TDD) signaling, the forward and reverse channels take turns using the same frequency band.

In addition to providing RF connectivity to a user, a base station typically provides connectivity to a mobile switching center (MSC). Often, one or more MSCs are used to cover a particular geographical region. Each MSC may service a number of base stations and associated cells in the cellular system and typically supports switching operations for routing calls between other systems (such as the PSTN) and the cellular system or for routing calls within the cellular system.

A base station subsystem (BSS) typically comprises a base transceiver station (BTS) and a base station controller (BSC). A BTS is typically controlled by the MSC via a base station controller (BSC) associated with the BTS. The BSC assigns RF carriers to support calls, coordinates the handoff of mobile users between base stations, and monitors and reports on the status of base stations in the BSS. The number of base stations controlled by a single MSC may depend upon the amount of traffic at each base station, the cost of interconnection between the MSC and the base stations, the topology of the service area and other similar factors.

The BTS includes radio transceivers that define a radio cell boundary and handles various radio interface protocols (e.g., Urn) with the mobile station. Moreover, the BTS typically supports all the required channel coding, encryption and speech coding required by the radio interface. The speech transcoding may be performed locally at the BTS or remotely at the BSC or MSC.

The BSC manages the radio resources of one or more BTSs. The BSC controls most of the features of the radio network, including allocation of radio time slots to a mobile station, release of the resources, interpretation of measurement results and control of radio interface handovers. The BSC interfaces to the BSS with the MSC.

The MSC provides functions required for switching calls to/from a mobile station and the packet-switched network or a mobile station to another mobile station. In addition, the MSC also provides various functions needed to track and maintain communication with the mobile station, such as call progress tone generation, registration, authentication, location updating and inter-MSC handovers.

Call progress tones are audible tones sent to calling parties to indicate the status of calls. Examples of call progress tones include a dial tone, ringing tone, busy tone, warning tone and so on. In addition, other types of tones, such as signaling tones, which may be in-band or out-of-band are used in a wireless network to provide support functions and services, such as call handover from one BSS to another, radio channel assignment, data services, emergency provisioning and the like.

The Internet and other packet-switched networks are increasingly used to replace analog TDM networks as a transmission medium for voice telephone calls. Voice over Internet Protocol (VoIP) telephony software and services now provide low cost, or even free, telephone calls anywhere in the world. With simple equipment at the subscriber end, a virtual connection can be established between two callers through a system of interconnected packet-based networks that may include the Internet, intranets or other digital networks. VoIP is thus emerging as a viable alternative to legacy trunked networks, as long as occasional delays and sometimes inferior quality of service can be tolerated.

Traditional Time Division Multiplexing (TDM) or similar trunked networks have been designed to carry signaling tones used in a wireless network. However, emerging network architectures have replaced these traditional networks with packet-switched networks, such as VoIP networks and other similar packet-switched networks that use packetization and voice signal compression, which typically do not support carrying signaling tones generated by, e.g., wireless networks. Consequently, to effectuate the use of these packet-switched networks with e.g., wireless networks, these packet-switched networks need to accommodate wireless network tones as well as different types of tones provided by different service providers.

SUMMARY OF THE INVENTION

The present invention overcomes shortcomings associated with the prior art by providing a technique that enables tones associated with e.g., wireless networks, to be accommodated in a packet-switched network, such as a Voice Over Internet Protocol (VoIP) network. The present invention provides an interface to, e.g., a call agent that may request certain tones be created and signaled towards a Time Division Multiplexing (TDM) side of the network and/or an IF side of the network. In addition, the inventive technique provides a mechanism to enable generated and signaled tones to be customized to accommodate, e.g., different types of tones for different types of service providers.

In the illustrated embodiment, a tone database contained in an intermediate node is configured with tone parameter information. The intermediate node is part of a VoIP packet-switched network and is coupled to one or more mobile switching units (MSCs) which are part of a time division multiple network (TDM). A call agent associated with the VoIP network generates a message containing a command that identifies a tone to be generated by the intermediate node. The message is forwarded to the intermediate node which (a) acquires the message, (b) queries its tone database to identify parameters associated with the tone, (c) generates the tone based on the identified parameters and (d) signals the tone onto the communication network. Based on the command, the tone is either signaled to a second intermediate node in the IP network or to a MSC in the TDM network.

Advantageously, by providing a flexible approach to generating and signaling tones, the present invention enables many different tone schemes to be supported by a communications network.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
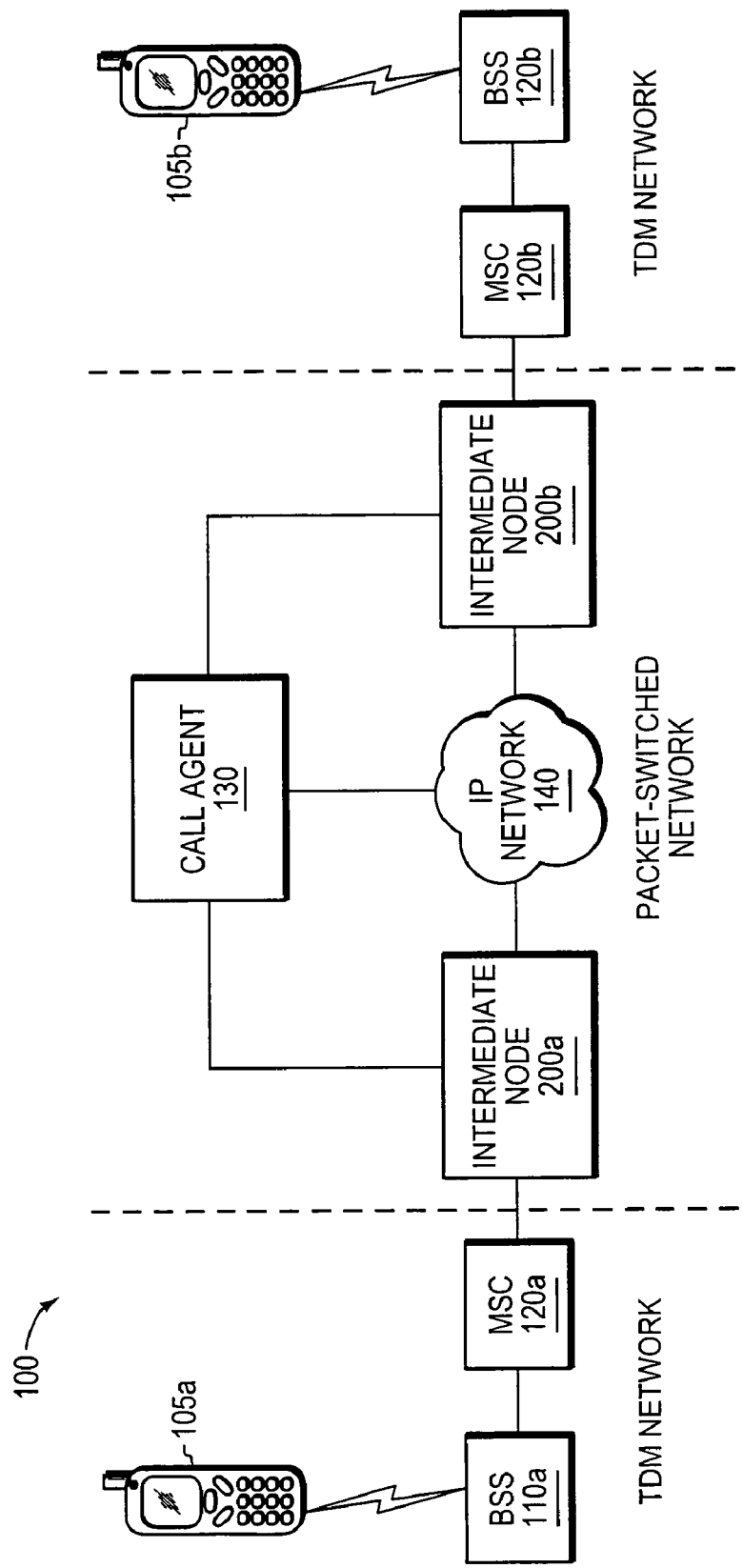
FIG. 1 is a high-level schematic block diagram of a communications network that may be used with the present invention.

FIG. 1 is a high-level schematic block diagram of a communications network 100 that may be used with the present invention. Network 100 comprises a plurality of time division multiplexing (TDM) networks coupled via a packet-switched network which is illustratively a Voice Over Internet Protocol (VoIP) network.

In the illustrated embodiment, the TDM network is implemented as a wireless network provided by a wireless service provider. It should be noted, however, other TDM networks, such as networks operated by a wired service provider, may be used with the present invention. Each TDM network contains various components including a base station subsystem (BSS) 110 coupled to a mobile switching center (MSC) 120. The BSS 110 may contain various subsystems, such as a base transceiver station (BTS) and a base station controller (BSC), which are configured to interface mobile stations 105 with the communications network 100 and provide various features in support of wireless communications with the mobile stations 105, such as managing radio link protocol with the mobile stations 105 as well as handover and channel setup. The MSC 120 performs various telephony functions for the TDM network, such as switching, managing security features, collecting billing data, controlling handover between BSSs 110 and managing the location of various mobile stations 105. Mobile stations 105 are conventional wireless mobile stations, such as mobile (cellular) telephones or personal computer systems, which enable users to communicate with each other via network 100.

The packet-switched network is implemented as a VoIP network comprising intermediate nodes 200 and a call agent 130 coupled via Internet Protocol (IP) network 140. The call agent 130 is a conventional call agent configured to handle various call control functions associated with VoIP calls made in communication network 100. The IP network 140 may comprise various nodes, such as data switches and routers, that are configured to handle VoIP traffic carried in the network 100. Components and nodes in network 100 exchange information using various protocols, such as IP, VoIP, and the Media Gateway Control Protocol (MGCP). It should be noted that a packet-switched network configured to implement Voice Over Asynchronous Transfer Mode (VoATM) may also take advantage of the present invention.

Figure 2:
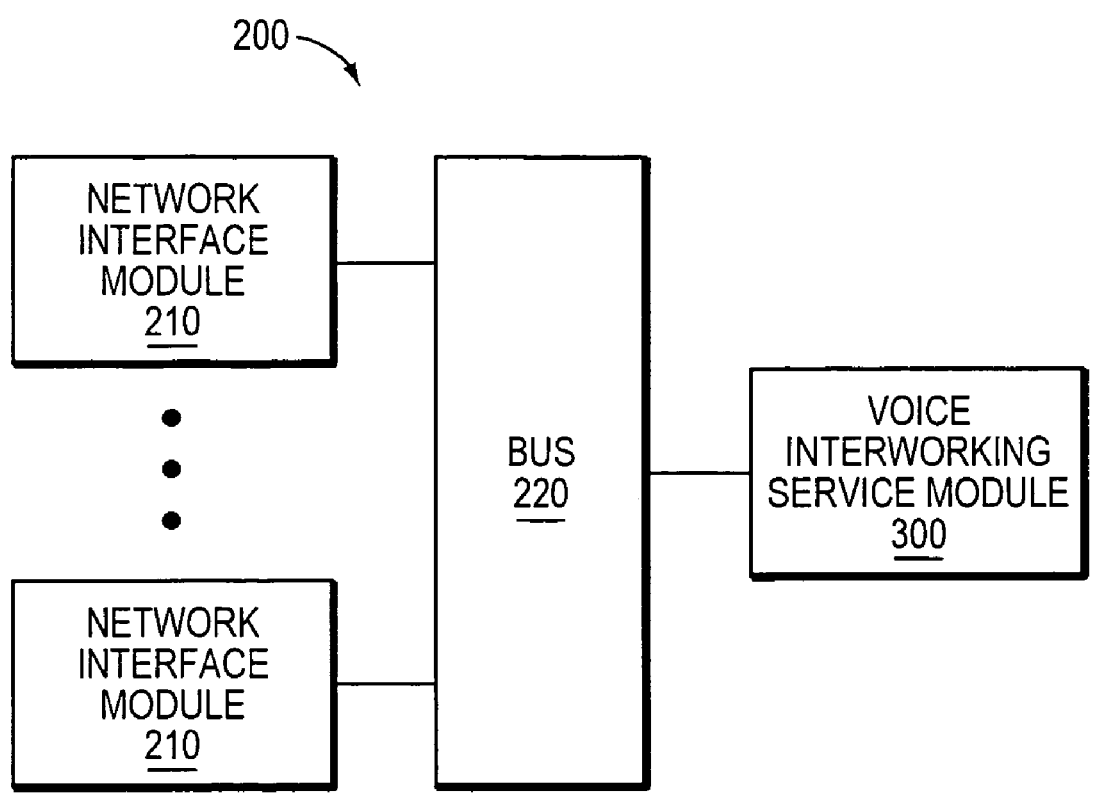
FIG. 2 is a high-level partial schematic block diagram of an intermediate node that may be used with the present invention.

FIG. 2 is a high-level partial schematic block diagram of an intermediate node 200 that may be used with the present invention. Node 200 is illustratively a data switch configured as a gateway and comprises various modules including one or more network interface modules 210 and a voice internetworking service module (VISM) 300 interconnected via a bus 220. A suitable data switch that may be used with the present invention is the Cisco MGX 8880 Media Gateway switch available from Cisco Systems Incorporated, San Jose, Calif. 95134.

The network interface modules 210 interface the intermediate node 200 with the network 100 and enable the intermediate node 200 to communicate with other components in network 100 using various protocols, such as ATM, frame relay, Ethernet and so on. To that end, modules 210 comprise conventional interface circuitry that incorporates signal, electrical and mechanical characteristics, and interchange circuits, needed to interface with the physical media of network 100 and protocols running over that media. Bus 220 is a point-to-point interconnect bus that contains logic and circuits that enable data to be transferred between the various modules contained in node 200.

Figure 3:
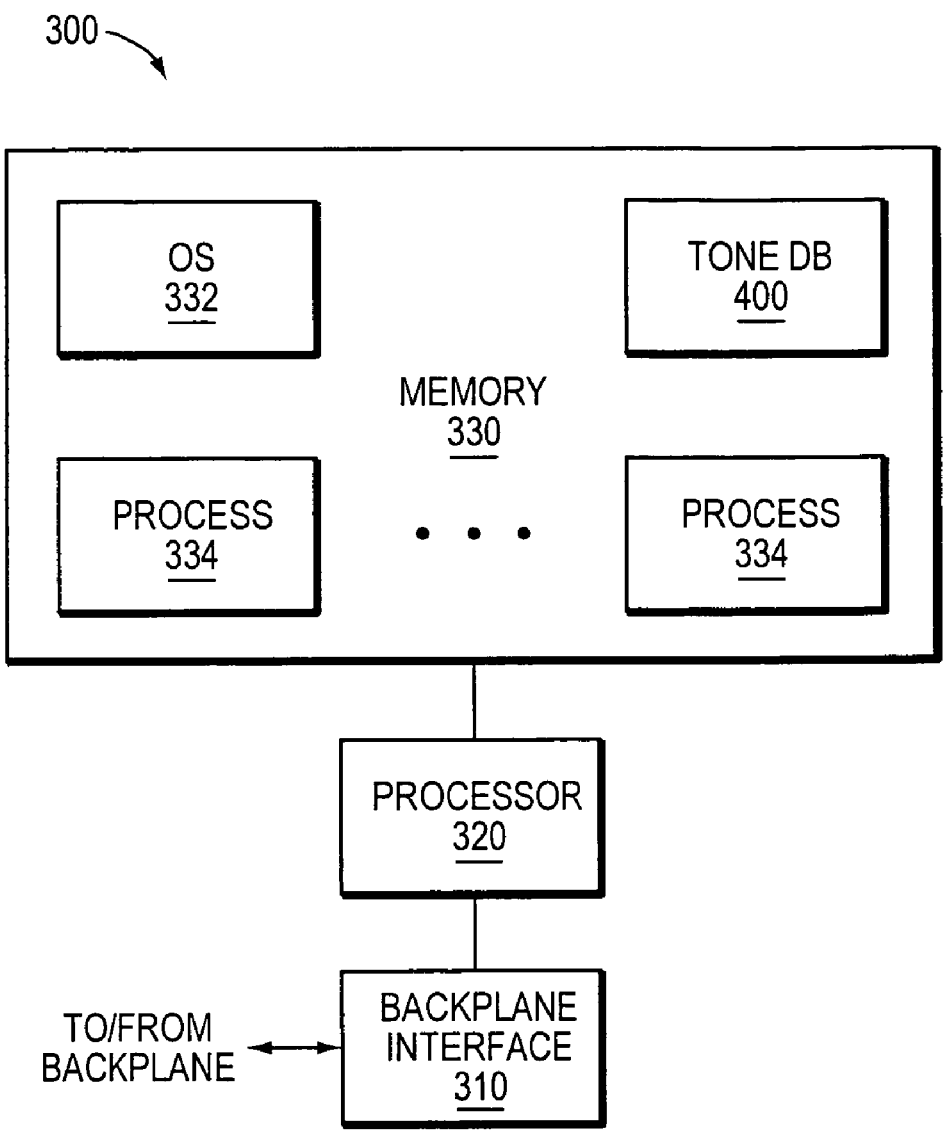
FIG. 3 is a high-level partial schematic block diagram of a voice interworking service module (VISM) that may be used with the present invention.

VISM 300 provides various functions that enable node 200 to support various protocols, such as VoIP and VoATM protocols. In addition, VISM 300 contains logic configured to generate and signal tones, such as call progress tones, between node 200 and other components in network 100 in accordance with the present invention. FIG. 3 is a partial schematic block diagram of a VISM 300 that may be used with the present invention. VISM 300 comprises a backplane interface 310, a processor 320 and a memory 330. A suitable VISM that may be used with the present invention is the Cisco VISM-PR available from Cisco Systems Incorporated.

The backplane interface 310 contains logic configured to interface the VISM 300 with the backplane 220 and enable data to be transferred between the VISM and modules coupled to the backplane 220. The processor 320 is illustratively a digital signal processor (DSP) comprising logic and circuitry configured to execute software and manipulate (i.e., access and maintain) data structures contained in memory 330 in support of generating and signaling tones in accordance with the present invention.

The memory 330 is a computer-readable medium organized as a random-access memory (RAM) and implemented using various RAM devices, such as dynamic-random-access memory (DRAM) devices. The memory is configured to hold various computer executable instructions and data structures including computer executable instructions and data structures that implement aspects of the present invention. It should be noted that other computer readable mediums, such as disk units and flash memory, may be configured to hold computer readable instructions and data that implement aspects of the present invention. In addition, it should be noted that various electromagnetic signals may be encoded to carry instructions and data that implement aspects of the present invention on a data network.

Memory 330 contains an operating system 332, one or more software processes 334 and a tone database (DB) 400. The operating system 332 contains computer executable instructions and data configured to implement various conventional operating system functions that functionally organize the VISM 300 by invoking operations in support of software processes 334 executing on the VISM 300. These functions may include scheduling the various processes 334 for execution as well as functions that enable data (e.g., packets) to be transferred between the processes 334 and various modules on node 200, such as network interface module 240. Processes 334 contain computer executable instructions and data configured to enable processor 320 to perform, e.g., various functions supported by VISM 300 including functions that incorporate aspects of the present invention, such as generating and signaling tones.

The present invention incorporates a technique that provides a flexible approach to generating and signaling tones in a communications network. According to the technique, parameters associated with tones generated and signaled in a communication network are dynamically configured. A tone to be generated and signaled onto the network is specified using a message that identifies the tone. Parameters associated with the tone are identified. The tone is then generated in accordance with the identified parameters and signaled onto the communications network.

Tone DB 400 is a pre-configured data structure that holds various parameters associated with tones that may generated and signaled in accordance with the present invention. These tones may include various call progress tones, special information tones (SITs) and pager cue tones, as well as custom tones and tones specified by the Telecommunication Industry Association (TIA) IS-41 standard and the like. In addition, these tones may include special tones specified by, e.g., a service provider operating the TDM network.

Figure 4:
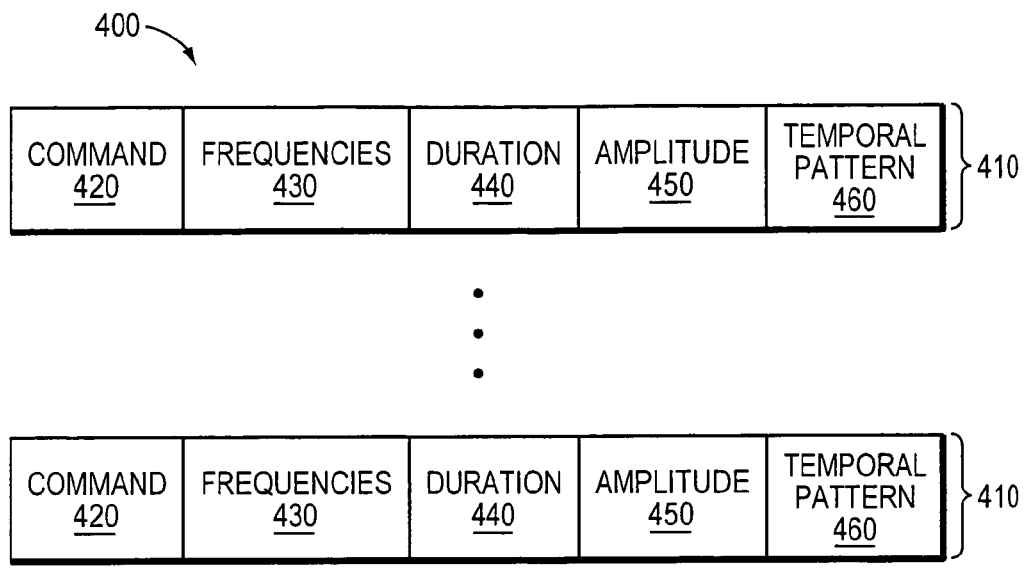
FIG. 4 is a schematic block diagram of a tone database that may be used with the present invention.

FIG. 4 is a schematic block diagram of tone DB 400 illustratively organized as a table comprising one or more entries 410 wherein each entry 410 is associated with a tone that is generated and signaled by intermediate node 200. Each entry 410 contains a command field 420, a frequencies field 430, a duration field 440, an amplitude field 450 and a temporal pattern field 460. The command field 420 holds a value that represents a command that directs intermediate node 200 to generate and signal the tone. The frequencies field 430 holds one or more values that represent frequencies that make up a tone. For example, a frequencies field 420 associated with a tone comprising two audio frequencies, such as a 1200 Hertz (Hz) frequency and a 1400 Hz frequency, would illustratively contain two values that represent these two frequencies, i.e., 1200 Hz and 1400 Hz. The duration field 440 holds a value that represents a duration of the tone, illustratively in milliseconds. The amplitude field 450 holds a value that represents an amplitude of the tone. The temporal pattern field 460 holds one or more values that represent a pattern for the tone. For example, field 460 may hold values that indicate the pattern for the tone is a steady tone or the tone is on and off for certain periods of time. It should be noted that entry 410 may contain other fields, such as a direction field that indicates a direction that a tone should be generated. For example, the direction field may indicate the tone is generated towards a MSC 120 or an intermediate node 200.

Figure 5:
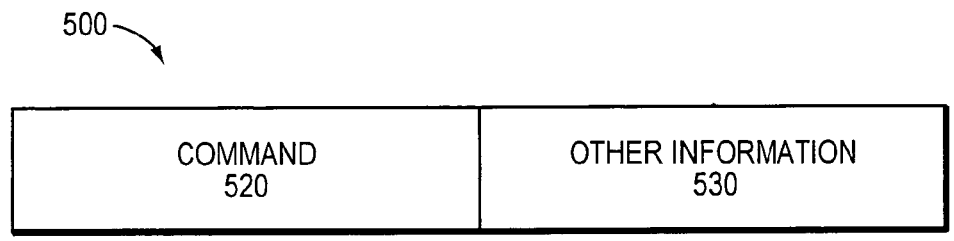
FIG. 5 is a schematic block diagram of a command message that may be used to with the present invention.

In accordance with the present invention, call agent 130 may request that (a) intermediate node 200 generate a tone and (b) signal the generated tone onto the communications network 100. Illustratively, the request is made in a form of a message containing a command that specifies the tone to be generated and signaled by intermediate node 200. FIG. 5 is a schematic block diagram of a message 500 that may be used to request a tone to be generated and signaled in accordance with the present invention. Message 500 comprises a command field 520 and an "other information" field 530. The other information field 530 holds information associated with the message 500, such as a cyclic redundancy check (CRC), status information and so on. The command field 520 holds a value that represents a command that specifies the tone that is to be generated and signaled. Illustratively, the command field 520 is coded in accordance with the MGCP which is described in F. Andreasen, et al., "Media Gateway Control Protocol (MGCP) Version 1.0," Request For Comments (RFC) 3435, January 2003, pp. 1-210 and B. Foster, et al., "Basic Media Gateway Control Protocol (MGCP) Packages," RFC 3660, December 2003, pp. 1-64, both of which are available from the Internet Engineering Task Force (IETF), http://www.ietf.org and both of which are incorporated by reference as though fully set forth herein.

Tones specified in the command 520 may include custom tones as well as tones specified by the TIA IS-41 standard. Table 1 illustrates various tones that may be illustratively generated by VISM 300 and their associated MGCP reference that may be specified in command 520 to select the tone.

TABLE 1

IS-41 Tones

| Tone Name | MGCP Reference |
| --- | --- |
| Dial Tone | L/dl |
| RingBack or AudibleAlerting | G/rt |
| InterceptTone or MobileReorder | G/rt |
| CongestionTone or ReorderTone | T/ro, G/cg, L/ro |
| BusyTone. | L/bz |
| ConfirmationTone. | G/cf |
| AnswerTone. | L/aw |
| CallWaitingTone | L/wt |
| OffHookTone | L/ot |
| RecallDialTone | L/sl |
| BargeInTone | L/s(12) |
| PPCInsufficientTone | L/s(13) |
| PPCWarningTone 1 | L/s(14) |
| PPCWarningTone2 | L/s(15) |
| PPCWarningTone3 | L/s(16) |

TABLE 1-continued

IS-41 Tones

| Tone Name | MGCP Reference |
|---|---|
| PPCDisconnectTone | L/s(17) |
| PPCRedirectTone | L/s(18) |
| TonesOff. | L/s(19) |
| PipTone. | L/s(20) |
| AbbreviatedIntercept | G/it(to = 4000) |
| AbbreviatedCongestion. | T/ro(to = 4000) |
| WarningTone. | L/s(21) |
| DenialToneBurst. | L/s(22) |
| DialToneBurst | L/dl(to = 2000) |
| IncomingAdditionalCallTone. | L/wt |
| PriorityAdditionalCallTone. | L/wt |
| Custom Tones | |
| Click Tone | L/s(23) |
| Milliwatt Tone -20 dBm | L/s(24) |
| Milliwatt Tone 0 dBm | L/s(25) |
| Silence | L/s(26) |
| Precise Dial Tone | L/s(27) |
| Continuity Tone | L/s(28) |
| Voice Path Continuity | L/s(29) |
| Test 105 Tone | L/s(30) |
| Acceptance Tone | L/s(31) |
| Alert Tone | L/s(32) |
| Account Prompt | L/s(33) |

Figure 6:
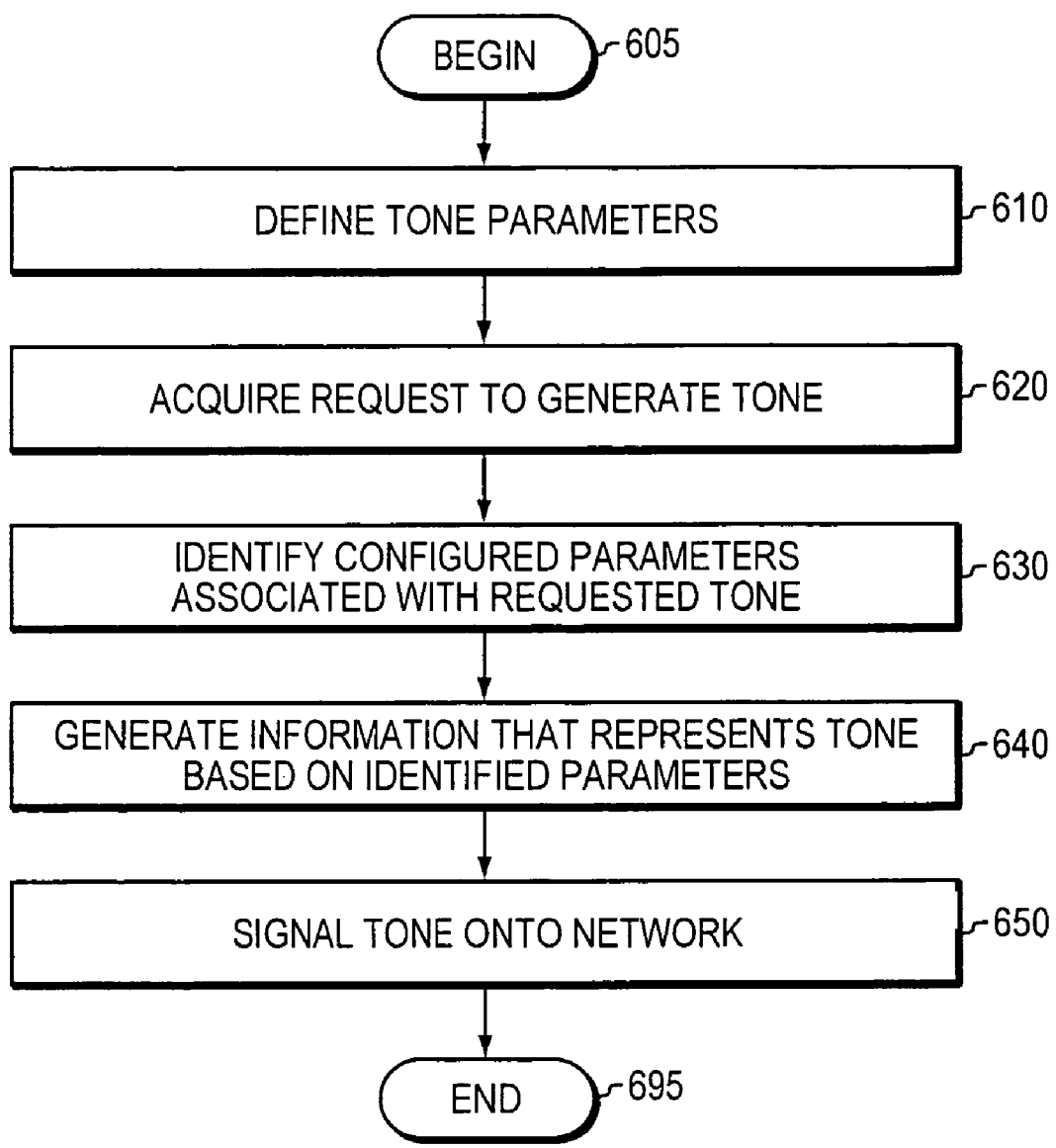
FIG. 6 is a flow diagram of a sequence of steps that may be used to generate a tone and signal it onto a communications network in accordance with the present invention.

As noted above, message 500 is illustratively used to request that intermediate node 200 generate and signal a tone onto the communications network 100. FIG. 6 is a flow chart of a sequence of steps that may be used to (a) generate a tone and (b) signal the tone onto a communications network to an endpoint (e.g., MSC 120, intermediate node 200) in accordance with the present invention. The sequence begins at step 605 and proceeds to step 610 where parameters are defined for tones that are to be generated and signaled. Illustratively, these parameters are defined by a user who accesses node 200 via a data terminal directly connected to the node 200 and pre-configures tone DB 400 with parameters associated with the tones. Alternatively, the user may access the node 200 through a web interface that communicates with, e.g., a web server on node 200, or through a system management application that communicates with the node 200 using a protocol, such as the well-known Simple Management Network Protocol (SNMP). The node 200 stores the defined parameters in the tone database 400. At step 620, a request from a call agent (e.g., call agent 130) to generate a tone is acquired (received) by node 200. Illustratively, node 200 receives a message 500 containing a command 520 that specifies a tone to be generated and signaled. At step 630, configured parameters associated with the tone are identified. Illustratively, node 200 identifies parameters associated with the tone by using the command 520 contained in message 500 to locate an entry 410 whose command field 420 contains a value that matches the command 520. Information (e.g., data packets) that represents the tone is then generated illustratively in accordance with various conventional encoding protocols and the identified parameters (step 640). The encoding protocol used to encode the tone in the information illustratively depends on the configuration of the endpoint and may include various well-known protocols, such as the G.711a, G.711u and G.729a protocols described in the International Telecommunication Union (ITU) Recommendation H.323. At step 650, the tone is then signaled onto the network to the endpoint by illustratively forwarding the information to the endpoint. The sequence ends at step 695.

For example, assume step 610 has been performed and the tone databases 400 of intermediate nodes 200*a-b* are preconfigured with parameters for various call progress tones, such as a dial tone and a ring. Further assume that a user at mobile station 105*a* wishes to place a call to a user at mobile station 105*b* and that mobile station 105*b* is "off-hook" (i.e., busy). The user at mobile station 105*a* begins the call sequence by taking station 105*a* off-hook which causes a signal that indicates the station 105*a* is off-hook to be transmitted from it to the call agent 130 via BSS 110*a*, MSC 120*a*, node 200*a* and IP network 140. The call agent 130 responds by directing intermediate node 200*a* to generate a tone that represents, e.g., a dial-tone.

Specifically, call agent 130 generates a message 500 (request) containing a command 520 that specifies that a dial tone is to be generated. Call agent 130 then forwards the message 500 to node 200*a* via IP network 140. At Step 620, node 200*a* acquires the message 500 and forwards it to its VISM 300. The VISM 300 acquires the message and processor 320 processes the message including using the command to locate an entry 410 in tone DB 400 whose command field 420 contains a value that matches the command 520 in the message (step 630). Processor 320 then uses the parameters in the matching entry 410 (i.e., frequencies 430, duration 440, amplitude 450 and temporal pattern 460) to generate information (e.g., packets) that represents the tone (step 640). Illustratively, the tone is encoded in the information in accordance with a conventional protocol, as described above. Node 200*a*, at step 650, signals the tone onto the network 100 to MSC 120*a* illustratively by forwarding the information to MSC 120*a*. MSC 120*a* acquires the information and, based on the information, generates necessary signals, based on the information, to cause a dial tone to be heard at mobile station 105*a*.

Now suppose the user at station 105*a* hears the dial tone and dials a phone number associated with base station 105*b*. A call request containing the phone number is transferred to call agent 130 which processes it, determines that mobile station 105*b* is busy and directs intermediate node 200*a* to generate a busy tone at mobile station 105*a* via a message 500 (request), as described above.

Node 200*a* acquires the message 500 (step 620) and forwards it to its VISM 300. The VISM 300 processes the message 500 including using the command 520 and tone DB 400, as described above, to identify parameters for the tone (step 630). The VISM 300 uses the parameter information associated with the matching entry 500 to generate the information that represents the tone (step 640). The tone is signaled onto the network (step 650) to the MSC 120*a*. Illustratively, the tone is signaled to MSC 120*a*, as described above. MSC 120*a* acquires the information and, based on the information, generates the necessary signals to cause a busy tone to heard at mobile station 105*a*.

Now assume mobile stations 105*a* calls mobile station 105*b* and mobile station 105*b* is not busy (i.e., not off-hook) when mobile station 105*a* dials mobile station 105*b*'s phone number. Call agent 130 generates a message 500 (request) containing a command 520 that specifies that a ring tone is to be generated at mobile stations 105*b*. Call agent 130 then forwards the message 500 to node 200*a* via IP network 140. At Step 620, node 200*a* acquires the message 500 and forwards it to its VISM 300. The VISM 300 acquires the message and processor 320, identifies parameters associated with the tone, (step 630), generates information that represents the tone and signals the tone onto the network 100 (steps 630-650), as described above. Node 200*b* acquires the information and forwards it to MSC 120*b* which acquires it and, based on the information, generates the necessary signals to cause a ring tone to be heard at mobile station 105b.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for generating a signaling tone in a communications network, the method carried out at a gateway intermediate node located between a time division multiplex network and a packet switched network, and the method comprising the steps of:

receiving, from one or more service providers, tone database configuration information related to one or more tone schemes;

receiving a first message at the gateway intermediate node from a mobile switching center in the time division network, the first message initiating a call progress tone generation sequence;

sending the first message from the gateway intermediate node to a call agent via the packet switched network;

receiving a second message at the gateway intermediate node from the call agent, the second message representing a request for the gateway intermediate node to generate the tone, the second message containing information associated with the requested tone;

using the information associated with the tone, accessing a preconfigured database to identify physical tone parameters needed to generate the tone, so that the gateway intermediate node is enabled to support multiple tone schemes and multiple service providers; and generating the tone based on the identified physical tone parameters at the gateway intermediate node, wherein the parameters stored in the database are defined by a user that accesses the gateway intermediate node using a data terminal directly connected to the intermediate node.

2. A method for generating a signaling tone in a communications network, the method carried out at a gateway intermediate node located between a time division multiplex network and a packet switched network, and the method comprising the steps of:

receiving, from one or more service providers, tone database configuration information related to one or more tone schemes;

receiving a first message at the gateway intermediate node from a mobile switching center in the time division network, the first message initiating a call progress tone generation sequence;

sending the first message from the gateway intermediate node to a call agent via the packet switched network;

receiving a second message at the gateway intermediate node from the call agent, the second message representing a request for the gateway intermediate node to generate the tone, the second message containing information associated with the requested tone;

using the information associated with the tone, accessing a preconfigured database to identify physical tone parameters needed to generate the tone, so that the gateway intermediate node is enabled to support multiple tone schemes and multiple service providers; and generating the tone based on the identified physical tone parameters at the gateway intermediate node, wherein the parameters stored in the database are defined by a user that accesses the gateway intermediate node using a protocol.

3. A method as defined in claim 2 wherein the protocol is the Simple Network Management Protocol (SNMP).

4. A method for generating a signaling tone in a communications network, the method carried out at a gateway intermediate node located between a time division multiplex network and a packet switched network, and the method comprising the steps of:

receiving, from one or more service providers, tone database configuration information related to one or more tone schemes;

receiving a first message at the gateway intermediate node from a mobile switching center in the time division network, the first message initiating a call progress tone generation sequence;

sending the first message from the gateway intermediate node to a call agent via the packet switched network;

receiving a second message at the gateway intermediate node from the call agent, the second message representing a request for the gateway intermediate node to generate the tone, the second message containing information associated with the requested tone;

using the information associated with the tone, accessing a preconfigured database to identify physical tone parameters needed to generate the tone, so that the gateway intermediate node is enabled to support multiple tone schemes and multiple service providers; and generating the tone based on the identified physical tone parameters at the gateway intermediate node, wherein the tone is generated at the gateway intermediate node in the communication network and signaled by the first gateway intermediate node to another gateway intermediate node in the communication network.

5. A method as defined in claim 4 wherein the tone is generated at the gateway intermediate node in the communication network and signaled to a mobile switching center (MSC) in the communication network.

6. A method as defined in claim 4 wherein the parameters stored in the database include one or more frequencies that make up the tone.

7. A method as defined in claim 4 wherein the parameters stored in the database include a duration that indicates a duration of the tone.

8. A method as defined in claim 4 wherein the parameters stored in the database include an amplitude that indicates an amplitude of the tone.

9. A method for generating a signaling tone in a communications network, the method carried out at a gateway intermediate node located between a time division multiplex network and a packet switched network, and the method comprising the steps of:

receiving, from one or more service providers, tone database configuration information related to one or more tone schemes;

receiving a first message at the gateway intermediate node from a mobile switching center in the time division network, the first message initiating a call progress tone generation sequence;

sending the first message from the gateway intermediate node to a call agent via the packet switched network;

receiving a second message at the gateway intermediate node from the call agent, the second message representing a request for the gateway intermediate node to generate the tone, the second message containing information associated with the requested tone;

using the information associated with the tone, accessing a preconfigured database to identify physical tone parameters needed to generate the tone, so that the gateway intermediate node is enabled to support multiple tone schemes and multiple service providers; and generating the tone based on the identified physical tone parameters at the gateway intermediate node, wherein the parameters stored in the database include a temporal pattern that indicates a pattern associated with the tone.

10. An apparatus for generating a signaling tone at a gateway intermediate node located between a time division multiplex network and a packet switched network in a communications network, the apparatus comprising:

a first receiver for receiving, from one or more service providers, tone database configuration information related to one or more tone schemes;

a second receiver for receiving a first message, at the gateway intermediate node, from a mobile switching center in the time division network, the first message initiating a call progress tone generation sequence;

a first transmitter for sending the first message from the gateway intermediate node to a call agent via the packet switched network;

a third receiver for receiving a second message at the gateway intermediate node from the call agent, the second message representing a request for the gateway intermediate node to generate the tone, the second message containing information associated with the requested tone; and a preconfigured database for using the information associated with the tone and identifying physical tone parameters needed to generate the tone, so that the gateway intermediate node is enabled to support multiple tone schemes and multiple service providers; and a tone generator for generating the tone based on the identified physical tone parameters at the gateway intermediate node, wherein the tone being generated at the gateway intermediate node in the communication network and signaled by the gateway intermediate node to another gateway intermediate node in the communication network.

11. An apparatus as defined in claim 10 wherein the tone is generated at the gateway intermediate node in the communication network and signaled to a mobile switching center (MSC) in the communication network.

12. The apparatus of claim 10 wherein the parameters stored in the database include one or more frequencies that make up the tone.

13. The apparatus of claim 10 wherein the parameters stored in the database include a duration that indicates a duration of the tone.

14. The apparatus of claim 10 wherein the parameters stored in the database include an amplitude that indicates an amplitude of the tone.

15. A gateway intermediate node for generating a signaling tone in a communications network, the gateway intermediate node being located between a time division multiplex network and a packet switched network and comprising:

means for receiving, from one or more service providers, tone database configuration information related to one or more tone schemes;

means for receiving a first message at the gateway intermediate node from a mobile switching center in the time division network, the first message initiating a call progress tone generation sequence;

means for sending the first message from the gateway intermediate node to a call agent via the packet switched network;

means for receiving a second message at the gateway intermediate node from the call agent, the second message representing a request for the gateway intermediate node to generate the tone, the second message containing information associated with the requested tone;

means for accessing a preconfigured-database to identify physical tone parameters needed to generate the tone, using the information associated with the tone, so that the gateway intermediate node is enabled to support multiple tone schemes and multiple service providers; and means for generating the tone based on the identified physical tone parameters at the gateway intermediate node, wherein the tone is generated at the first gateway intermediate node in the communication network and signaled by the gateway intermediate node to another gateway intermediate node in the communication network.

16. A tangible, non-transitory, computer readable medium for storing computer executable instructions for generating a signaling tone at a gateway intermediate node located between a time division multiplex network and a packet switched network, in a communications network, the computer executable instructions for:

receiving, from one or more service providers, tone database configuration information related to one or more tone schemes;

receiving a first message at the gateway intermediate node from a mobile switching center in the time division network, the first message initiating a call progress tone generation sequence;

sending the first message from the gateway intermediate node to a call agent via the packet switched network;

receiving a second message at the gateway intermediate node from the call agent, the second message representing a request for the gateway intermediate node to generate the tone, the second message containing information associated with the requested tone;

using the information associated with the tone, accessing a preconfigured database to identify physical tone parameters needed to generate the tone, so that the gateway intermediate node is enabled to support multiple tone schemes and multiple service providers; and generating the tone based on the identified physical tone parameters at the gateway intermediate node, the tone being generated at a first gateway intermediate node in the communication network and signaled by the first gateway intermediate node to a second gateway intermediate node in the communication network.

* * * * *

UNITED STATES PATENT AND TRADEMARK OFFICE
CERTIFICATE OF CORRECTION

| | | |
|---|---|---|
| PATENT NO. | : 7,881,712 B1 | |
| APPLICATION NO. | : 11/113679 | |
| DATED | : February 1, 2011 | |
| INVENTOR(S) | : Chengsheng Luo et al. | |

It is certified that error appears in the above-identified patent and that said Letters Patent is hereby corrected as shown below:

Column 10, Claim 4, line 34, delete "first".

Signed and Sealed this
Nineteenth Day of April, 2011

David J. Kappos
*Director of the United States Patent and Trademark Office*